United States Patent Office 3,526,510
Patented Sept. 1, 1970

3,526,510
BEER FOAM ADHESION
Leonard Raymond, White Plains, N.Y., John B. Bockelmann, Tenafly, N.J., and William Tirado, Oceanside, N.Y., assignors to The F. M. Schaefer Brewing Company, Brooklyn, N.Y.
No Drawing. Filed Dec. 4, 1967, Ser. No. 687,437
Int. Cl. C12h 1/14
U.S. Cl. 99—48      12 Claims

ABSTRACT OF THE DISCLOSURE

The "curtain" forming property of beer, which is lost when certain parabens are used as chemical "pasteurizers," i.e. bacterial growth inhibitors, is restored by the incorporation into the beer of an effective amount of one or more of sodium dioctyl sulfosuccinate, sodium dihexyl sulfosuccinate, sodium diamyl sulfosuccinate, disodium N-octadecyl-sulfosuccinamate and tetrasodium N-(1,2-dicarboxyethyl)-N - octadecyl-sulfosuccinamate.

---

The present invention relates to a novel method of enhancing so-called foam cling in certain beers or the like, as hereinafter more specifically set forth.

The use, as additive, of the heptyl ester or the octyl ester of para-hydroxy-benzoic acid, as such or in the form of an alkali metal salt or alkaline earth metal salt thereof, as a chemical "pasteurizer" for beer (cf. U.S. Pat. No. 3,232,766) has eliminated the necessity for conventional pasteurization as a means for preserving beer against undesired bacterial growth. However, the presence of the said additive in beer is bound up with a drawback in that the normal foam produced by the pouring of the beer into a glass no longer has the adhesion or cling which is generally associated with beer quality and which is produced by conventional pasteurized or draft beer.

Various agents are known for achieving good adhesion to the sides of the glass from beer containing the aforesaid additives. However, these are bound up with one disadvantage or another. Elimination of the additive agents results in a beer foam that rapidly wipes the glass clean, leaving no beer foam cling and imparting, from the standpoint of those who equate beer foam cling with good quality and good appearance, an inferior aspect to the beer in the glass. Accordingly, it is a desideratum in the art of making paraban-"pasteurized" finished beer to provide an additive which is free from any disadvantage or undesired drawback and which imparts to the beer containing heptyl or octyl ester of para-hydroxy-benzoic acid the capacity of forming, upon being poured into a glass, a normal foam of good stability and good cling (sometimes referred to as "curtain" formation).

A primary object of the present invention is the realization of the aforesaid desideratum. Briefly stated, this is achieved according to the present invention by the expedient of incorporating into beer which has been paraben-"pasteurized" an appropriate and effective amount of, as "foam stabilizer" and "curtain" former, one or more of (a) sodium dioctyl sulfosuccinate

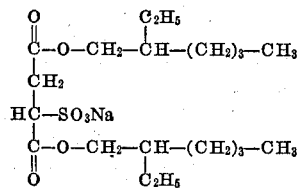

(cf. U.S. Pat. No. 2,441,341);
(b) sodium dihexyl sulfosuccinate;
(c) sodium diamyl sulfosuccinate;
(d) disodium N-octadecyl sulfosuccinamate (cf. U.S. Pat. No. 2,252,401); and
(e) tetrasodium N-(1,2-dicarboxyethyl)-N-octadecylsulfosuccinamate (cf. U.S. Pat. No. 2,438,092).

The term "paraben" as here employed refers to the aforesaid heptyl or octyl ester or the alkali metal (e.g. sodium) or alkaline earth metal (e.g. calcium) salt thereof.

In accordance with the present invention, the "curtain former" can be incorporated into the beer in an amount of as little as 1 part per million (p.p.m.) with beneficial effect. Increase in concentration of the aforesaid "curtain former" in the beer, i.e. increase of the amount thereof added to the beer, results within certain limits in a corresponding increase of beer foam adhesion to the glass.

In measuring foam adhesion for the purposes of the present invention, use is made of an arbitrary scale ranging from a value of zero to a value of ten: the higher the value on the scale, the greater the area of cling. On this scale, conventional pasteurized or draft beer has an average value of 6½; the "control," i.e. beer which has been chemically "pasteurized" with heptyl ester of para-hydroxybenzoic acid, has a value of zero. The foam adhesion or lace curtain forming values can be estimated quite accurately visually, or by any other method known in the art; cf. for example the method presented before the annual meeting of the American Society of Brewing Chemists in 1962 by Henry L. Ziliotto, John B. Bockelmann and William Tirado (cf. A.S.B.C. Proceedings, 1962, 77–80).

Increase in the added amount of curtain former according to the present invention up to about 50 or more p.p.m. (50 or more parts by weight of the additive per million parts by weight of paraben-"pasteurized" beer) gives noteworthy improvement in foam clinging effect. The concentration of curtain former can be increased with some increase in curtain cling; however, too high a concentration tends to give rise to off-flavor and/or to promote haze conditions, either or both of which may result in unacceptable beers from a quality standpoint.

There is no critical time or method of incorporating the aforementioned sulfosuccinate or sulfosuccinamate into the beer. Incorporation may be effected at any convenient stage in the production of the beer, which takes place in the per se conventional manner; the curtain former according to this invention may even be incorporated into the bottled or otherwise packaged beer prior to closing the respective containers. It is conveniently added after the first filtration of the beer (following completion of fermentation) and prior to the polish filtration.

The paraben employed, e.g. the heptyl or octyl ester or para-hydroxybenzoic acid, is preferably added to the so-called "finished" beer, that is, after the final filtration. It is sometimes, however, added prior to the final filtration in those cases where a filter medium is used which does not absorb the paraben. The sulfosuccinate or sulfosuccinamate, used as curtain former in this invention, can, in such case, be added concomitantly with the heptyl or octyl ester.

The property of foam adherence, to the realization of which the present invention is primarily directed, is distinct from the property of foam retention. Foam retention, or foam life, is a quality denoting the ability of the "head," or layer of foam on a beer, to resist collapse with passage of time. Foam adherence, as will be clear from the preceding, refers to the ability of the foam, as it collapses or as the beer is drained away, to leave a film of foam curtain or lace clinging to the wall of the glass. It is from this curtain that the measurement or value of foam adherence is obtained. A significant foam curtain can be formed from beer, the head of which has completely collapsed and disappeared. Absent the additive—sodium dioctyl sulfosuccinate, sodium hexyl sulfosuccinate, sodium diamyl sulfosuccinate, disodium N-octadecyl-sulfosuccinamate and/or tetrasodium N-(1,2-dicarboxyethyl)-N-octadecyl-sulfosuccamate—according to this invention, no significant foam curtain can be produced by paraben-"pasteurized" beer.

While such beer will produce a foam, the stability of the foam is enhanced by the further incorporation into the beer of a foam stabilizer, preferably propylene glycol alginate as disclosed in U.S. Pat. No. 2,426,125. Such propylene glycol alginate is commercially available as Kelcoloid-L. This foam stabilizer may be used in a range from 20 p.p.m. to as high as 500 p.p.m., the preferred range being from about 40 to about 120 p.p.m. It will be understood that the use of foam stabilizer is entirely optional and per se constitutes no part of the present invention, since the objective curtain cling can be realized according to this invention, even in the total absence of the foam stabilizer If the latter is used, it is conveniently added concurrently with the curtain cling-promoting additive(s) of this invention, after the first filtration and prior to the final filtration.

Although it is more convenient to add the propylene glycol alginate and aforesaid sulfosuccinate or sulfosuccinamate to the beer in the same stock solution as the heptyl or octyl para-hydroxybenzoate or salt thereof, this is not necessary. They may be added separately and may even be added prior to the final filtration as indicated previously. It is preferred to add the propylene glycol alginate and the curtain promoting additive from a single stock solution directly into the beer stream following the first filtration, and to add the paraben to the beer stream following the final filtration.

According to this invention, (1) individual stock solutions may be prepared containing the predetermined amount of heptyl or octyl para-hydroxybenzoate or salt thereof, of propylene glycol alginate, and of aforesaid sulfosuccinate or sulfosuccamate; or, (2) stock solutions may be prepared containing the predetermined amounts of any of these elements in any combination. If a production quantity of beer is to be treated, the proper amount of stock solution(s) is added to the beer stream or amount of stock solution(s) is added to the beer stream or to the beer in tanks at the desired stage in the plant operation. If laboratory quantities or bottled amounts of beer are to be treated, the proper amount of stock solution of heptyl or octyl para-hydroxybenzoate or salt thereof is added to the empty bottle or can, the unpasteurized finished beer is placed in the package, and the package sealed. After the beer has come to rest, the package is unsealed, the proper amounts of stock solutions of the additives are added thereto, and the package is resealed.

There is thus provided a beer composition which is protected against microbial growth and need not be pasteurized or refrigerated and which in addition possesses commerically acceptable stability and foam adherence properties as well as the other properties which are indicative of a commercially acceptable beer. The procedure according to the examples; infra, may also be followed.

The effectiveness of the "curtain formers" according to the present invention is entirely unforeseeable and wholly unexpected, especially in view of the fact that when they are used as additives to conventional beer—i.e. beer which contains no paraben as chemical "pasteurizer"—they are inert, i.e. do not affect foam cling favorably or unfavorably, having no effect at all on such cling.

It is noteworthy that the cling-enhancing additives of the invention are all anionic surfactants.

Although reference has hereinbefore been made only to "beer," this is intended to be illustrative of the beer, such as lager, porter, stout, bock, ale and malt liquor which may be utilized and to each of which the present invention is equally applicable and effective.

In the examples which follow and which are intended solely to be illustrative and not exhaustive of the invention, "ml." stands for milliliter(s), "mg." stands for milligram(s), and "p.p.m." stands for part(s) per million, the parts being parts by weight; percentages are also by weight.

EXAMPLE 1

50% dioctyl sodium sulfosuccinate in an aqueous beverage grade ethanol solution is prepared into a stock solution by adding 0.175 gram of the above 50% solution into 50 mls. of ethanol. Thus, 1 ml./350 ml. of beer=5 p.p.m. of active ingredient, since the original solution contains 50% of active ingredient.

The sodium dioctyl sulfosuccinate is added directly to each of a group (at least 6) of clean, standard 12 oz. brown beer bottles, each bottle being overfoamed and capped, until the beer therein is subjected to the standard foam adherence testing (visual). On testing, the beer is of course poured into a conventional glass, whereupon foaming takes place and cling produced as an incident to the subsiding of the foam, as previously explained.

Results:  Foam adherence (average value)
Control Staypro [1] beer, no additive _____ 2.8
Staypro beer + 3 p.p.m. dioctyl sodium sulfosuccinate _____ 4.0
Staypro beer + 3 p.p.m. dioctyl sodium sulfosuccinate _____ 6.4
Staypro beer + 5 p.p.m. dioctyl sodium sulfosuccinate _____ 6.4
Staypro beer + 10 p.p.m. dioctyl sodium sulfosuccinate _____ 6.5

[1] "Staypro" beer is beer prepared according to U.S. Pat. No. 3,232,766, i.e. beer containing heptyl ester of p-hydroxybenzoic acid (12 p.p.m.) as chemical "pasteurizing" agent and which also contains Kelcoloid-L (60 p.p.m.) as foam stabilizer. Gum arabic may also be used together with or in lieu of the alginate.

EXAMPLE 2

The procedure according to Example 1 is repeated for sodium dihexyl sulfosuccinate.

Sodium dihexyl sulfosuccinate (80% active ingredient solution) is prepared into a stock solution so that 1 ml./350 ml. equals 10 p.p.m. of active ingredient, by diluting 220 mg. of the 80% solution to 50 ml. with ethanol. The resulting stock solution is added directly to the beer in the proper amounts to give the various concentrations. For higher concentrations of additive, stock solution is prepared in which 1 ml. of additive contains 50 p.p.m. of active ingredient.

Results:  Foam adherence (average value)
- Control, Staypro beer, no additive _____ 2.8
- Staypro beer, 1 p.p.m. sodium dihexyl sulfosuccinate _____ 2.6
- Staypro beer, 3 p.p.m. sodium dihexyl sulfosuccinate _____ 2.2
- Staypro beer, 5 p.p.m. sodium dihexyl sulfosuccinate _____ 3.1
- Staypro beer, 10 p.p.m. sodium dihexyl sulfosuccinate _____ 3.8
- Staypro beer, 15 p.p.m. sodium dihexyl sulfosuccinate _____ 4.2
- Staypro beer, 20 p.p.m. sodium dihexyl sulfosuccinate _____ 5.7
- Staypro beer, 25 p.p.m. sodium dihexyl sulfosuccinate _____ 5.8
- Staypro beer, 30 p.p.m. sodium dihexyl sulfosuccinate _____ 6.0
- Staypro beer, 40 p.p.m. sodium dihexyl sulfosuccinate _____ 6.0
- Staypro beer, 50 p.p.m. sodium dihexyl sulfosuccinate _____ 6.3

EXAMPLE 3

Tetrasodium-N-(1,2-dicarboxyethyl)-N-octadecyl sulfosuccinamate ("TSOS") is prepared into a stock solution so that 1 ml./350 ml.=10 p.p.m., by dissolving 175 mg. of "TSOS" in water and bringing up to 50 ml. with water. For the rest, the precedingly-described procedure is followed.

Results:  Foam adherence (average value)
- Control, Staypro beer, no additive _____ 2.8
- Staypro beer+1 p.p.m. "TSOS" _____ 2.5
- Staypro beer+3 p.p.m. "TSOS" _____ 3.4
- Staypro beer+5 p.p.m. "TSOS" _____ 4.1
- Staypro beer+10 p.p.m. "TSOS" _____ 4.7

In all of the foregoing example (1, 2 and 3), larger concentrations of the additives can be used as desired, up to the incidence of flavor and/or haze conditions which result in commercially unacceptable beers from a quality point of view.

EXAMPLE 4

(a) The procedure according to Example 1 is repeated except that the Kelcoloid is omitted. Essentially the same results are obtained.

(b) The procedure according to Example 2 is repeated except that the Kelcoloid is omitted. Essentially the same results are obtained.

(c) The procedure according to Example 3 is repeated except that the Kelcoloid is omitted. Essentially the same results are obtained.

The incorporation of propylene glycol alginate alone into the paraben-treated finished beer does not, in the absence of the additive according to this invention, suffice to enhance the foam adhesion property of the beer.

EXAMPLE 5

(A) Dissolve 13½ pounds (lbs.) of propylene glycol alginate (Kelcoloid-L) in three (3) barrels (bbls.) of water by very gradually adding the material to the water with vigorous agitation. Stir for approximately one-half hour to yield a homogeneous solution. To this solution add 1.16 lbs. of sodium dioctyl sulfosuccinate and continue the agitation until dissolved.

Proportion the resultant solution into a stream of 900 bbls. of beer issuing from the filter subsequent to the lagering stage of brewing. The beer in the tank after this addition contains 60 p.p.m. Kelcoloid-L and 5 p.p.m. of sodium dioctyl sulfosuccinate.

(B) Prepare a two-gallon stock solution of the sodium salt of n-heptyl para-hydroxybenzoate in the following manner:

The quantity of sodium hydroxide required to form the sodium salt of 136.2 grams of n-heptyl para-hydroxybenzoate is calculated as follows:

$$\frac{136}{236} \times 40 = 23$$

grams of NaOH per 136 grams of n-heptyl para-hydroxybenzoate. (236=mol. wt. of n-heptyl para-hydroxybenzoate 40=mol. wt. of NaOH.)

Dissolve the 23 grams of NaOH in two gallons of water. Dissolve 136.2 grams of n-heptyl para-hydroxybenzoate in 50 ml. of 45% ethyl alcohol. The alcohol solution is added to the two-gallon solution of water and NaOH and the mixture is agitated constantly during the addition to assure rapid distribution. The pH of the final water solution is 11.2.

This water solution is proportioned into 100 bbls. of the beer from part (A) above as this beer flows from the final filter into the finished beer tank. The rate of flow from the final filter is 384 bbls. per hour. The water solution is pumped in over a period of 15.7 minutes which is the time required for 100 bbls. to flow from the final filter into the finish tank. The beer obtained in the finish tank is protected against microbial growth and possesses good stability and excellent foam adherence properties as well as the other attributes of a commercially acceptable beer. (It is noteworthy in this regard that all the ingredients mentioned in this example are FDA-approved.)

Having thus disclosed the invention, what is claimed is:

1. The method of imparting foam adhesion property to a fermented alcoholic beverage which contains a bacterial growth-inhibiting amount of a member selected from the group consisting of heptyl para-hydroxybenzoate, octyl parahydroxybenzoate and alkali metal salts and alkaline earth metal salts thereof, which comprises incorporating into said fermented alcoholic beverage at any stage of the preparation thereof an effective amount of a cling-enhancing compond selected from the group consisting of sodium dioctyl sulfosuccinate, sodium dihexyl sulfosuccinate, sodium diamyl sulfosuccinate, disodium N-octadecyl-sulfosuccinamate and tetrasodium N-(1,2-dicarboxyethyl)-N-octadecyl-sulfosuccinamate.

2. The method according to claim 1, wherein the amount of cling-enhancing compound is from 1 part to about 50 parts per million parts of beer or the like.

3. The method of imparting foam adhesion property to finished unpasteurized beer which has been protected against microbial growth with heptyl para-hydroxybenzoate, which comprises homogeneously incorporating into the beer 1 part to about 50 parts per million parts of the beer of a cling-enhancing compound selected from the group consisting of sodium dioctyl sulfosuccinate, sodium dihexyl sulfosuccinate, sodium diamyl sulfosuccinate, disodium N-octadecyl-sulfosuccinamate and tetra-sodium N-(1,2-dicarboxyethyl) - N - octadecyl - sulfosuccinamate.

4. The method according to claim 2, wherein a foam stabilizing amount of propylene glycol alginate is also incorporated into the beer or the like.

5. The method according to claim 3, wherein a foam stabilizing amount of propylene glycol alginate is also incorporated into the beer or the like.

6. A composition which comprises (1) fermented alcoholic beverage protected against microbial growth with a member selected from the group consisting of heptyl parahydroxybenzoate, octyl para-hydroxybenzoate and alkali metal salts and alkaline earth metal salts thereof and (2) 1 part to about 50 parts per million parts of the said beverage of a cling-enhancing compound selected from the group consisting of sodium dioctyl sulfosuccinate, sodium dihexyl sulfosuccinate, sodium diamyl sulfosuccinate, disodium N - octadecyl - sulfosuccinamate and tetra - sodium N - (1,2, - dicarboxyethyl) -N - octa-decyl-sulfosuccinamate.

7. A composition according to claim 6 wherein there is also present a foam stabilizing amount of propylene glycol alginate.

8. A composition which comprises (1) beer protected against microbial growth with heptyl para-hydroxybenzoate and (2) 1 part to about 50 parts per million parts of the beer of a cling-enhancing compound selected from the group consisting of sodium dioctyl sulfosuccinate, sodium dihexyl sulfosuccinate, sodium diamyl sulfosuccinate, disodium N-octadecyl-sulfosuccinamate and tetrasodium N - (1,2 - dicarboxyethyl)-N-octadecylsulfosuccinamate.

9. A composition according to claim 8, wherein there is also present a foam stabilizing amount of propylene glycol alginate.

10. A composition according to claim 6 wherein the fermented beverage is beer, ale, porter, stout, bock or malt liquor.

11. A method according to claim 3, wherein the cling-enhancing compound is sodium dioctyl sulfosuccinate.

12. A composition according to claim 8 wherein the cling-enhancing compound is sodium dioctyl sulfosuccinate.

References Cited

UNITED STATES PATENTS

| 3,266,902 | 8/1966 | Brenner | 99—48 |
| 3,351,471 | 11/1967 | Demler et al. | 99—78 |
| 3,443,957 | 5/1969 | Segel et al. | 99—48 |

LIONEL M. SHAPIRO, Primary Examiner

D. M. NAFF, Assistant Examiner

U.S. Cl. X.R.

99—31

UNITED STATES PATENT OFFICE
CERTIFICATE OF CORRECTION

Patent No. 3,526,510            Dated September 1, 1970

Inventor(s) Leonard Raymond et al.

It is certified that error appears in the above-identified patent and that said Letters Patent are hereby corrected as shown below:

Column 4, line 49, "3 p.p.m." should read -- 1 p.p.m. --.

Signed and sealed this 1st day of December 1970.

(SEAL)
Attest:

EDWARD M. FLETCHER, JR.           WILLIAM E. SCHUYLER, JR.
Attesting Officer                   Commissioner of Patents